US009069792B1

(12) United States Patent
Craighead

(10) Patent No.: US 9,069,792 B1
(45) Date of Patent: Jun. 30, 2015

(54) METHOD AND SYSTEM FOR PERSISTENTLY CACHED, COPY-ON-WRITE VIEW OF REVISION CONTROL TREES

(75) Inventor: Matthew J. Craighead, Austin, TX (US)

(73) Assignee: Conifer Systems LLC, Austin, TX (US)

( * ) Notice: Subject to any disclaimer, the term of this patent is extended or adjusted under 35 U.S.C. 154(b) by 868 days.

(21) Appl. No.: 12/196,937

(22) Filed: Aug. 22, 2008

(51) Int. Cl.
G06F 17/30 (2006.01)

(52) U.S. Cl.
CPC ...... *G06F 17/3023* (2013.01); *G06F 17/30132* (2013.01)

(58) Field of Classification Search
USPC .......................... 707/653, 657, 829, 638, 793
See application file for complete search history.

(56) References Cited

U.S. PATENT DOCUMENTS

| | | | |
|---|---|---|---|
| 5,740,370 A * | 4/1998 | Battersby et al. ............. | 709/219 |
| 5,832,263 A * | 11/1998 | Hansen et al. ................ | 719/322 |
| 6,904,454 B2 | 6/2005 | Stickler | |
| 6,910,051 B2 | 6/2005 | Buesing et al. | |
| 6,996,584 B2 * | 2/2006 | White et al. ......................... | 1/1 |
| 7,246,104 B2 | 7/2007 | Stickler | |
| 7,353,236 B2 | 4/2008 | Stickler | |
| 7,680,932 B2 | 3/2010 | Defaix et al. | |
| 7,788,239 B2 | 8/2010 | Scholl et al. | |
| 7,900,050 B2 | 3/2011 | Izu et al. | |
| 2002/0078244 A1 * | 6/2002 | Howard ......................... | 709/248 |
| 2002/0109718 A1 * | 8/2002 | Mansour et al. .............. | 345/744 |
| 2005/0144200 A1 * | 6/2005 | Hesselink et al. ............. | 707/204 |
| 2007/0288494 A1 * | 12/2007 | Chrin et al. ................... | 707/100 |
| 2009/0144342 A1 * | 6/2009 | Sudhakar ....................... | 707/203 |

OTHER PUBLICATIONS

Soules et al. "Metadata Efficiency in Versioning File Systems" Apr. 2003, Proceedings of FAST '03: 2nd USENIX Conference on File and Storage Technologies, pp. 43-58.*
Yi et al. "incremental Maintenance of XML Structural Indexes" Jun. 2004, SIGMOD 2004, 12 pages.*

* cited by examiner

*Primary Examiner* — James E Richardson
(74) *Attorney, Agent, or Firm* — Campbell Stephenson LLP

(57) ABSTRACT

A method and system for efficient usage of revision control system resources by providing a client-based file system tree based on managed cache resources is provided. The managed cache resources include both a persistent, disk-based cache that maintains copies of requested file data from a repository server and an ordered tree data structure-based metadata cache for tracking file metadata across revisions. Embodiments of the present invention further maintain in the data cache data related only to specifically requested files. Embodiments of the present invention further track a range of versions of the file system tree for which particular file versions are applicable, so that unnecessary downloading to the client of unchanged files is avoided. Thus, file data and metadata are only requested from a repository server when needed and only a single version of a file is maintained until a modification to that file is made.

38 Claims, 10 Drawing Sheets

METHOD AND SYSTEM FOR PERSISTENTLY CACHED, COPY-ON-WRITE VIEW OF REVISION CONTROL TREES

FIELD OF THE INVENTION

The present invention relates to the field of revision control systems, and particularly to providing a persistently cached, copy-on-write view of file system trees for clients of a revision control system.

BACKGROUND OF THE INVENTION

Modern computer software and hardware development projects often require a large number of people (e.g., programmers, engineers, technical writers, and artists) working in parallel to generate a product. Since this large number of people often require access to a common set of information and an ability to modify that information (e.g., software code), a mechanism for sharing this information among collaborators is necessary. A revision control system is a centralized system for sharing such information in a controlled manner.

Revision control systems maintain historical copies of all source code and other relevant artifacts (e.g., images, documentation, tools, and test cases) that are used in building the project. At the core of a revision control system is a repository server, which maintains a central store of data called the repository. A repository can store project information in the form of a file system tree, which is a typical hierarchy of files and directories. Unlike a standard file system, however, a repository contains every past version of every file in the file system tree since the beginning of a project, and the repository maintains a record of when each change was made to each file and, typically, information as to why such changes were made and who made those changes. Using a repository, a user can reconstruct a precise state of the project at all points in time during the development of that project.

In a typical revision control system environment, if a user wants to make changes to files in the repository, the user first checks out a copy of relevant portions of the file system tree of the project in interest to a local storage volume of the user's client computer. The user will then edit the local copy of the files. Once the user is satisfied with the changes that have been made, those changes are "committed" back to the repository. A commit typically involves scanning through the user's copy of the file system tree for files which have been changed, and then uploading the changed files back to the repository server to update the repository. In order to determine the changes made to files, a client typically stores two copies of every file on the local volume, one of which is maintained in its original form. In order to store two copies of the relevant portions of the project file system tree, client resources are expended in the form of disk space to maintain the file system tree copies and repository server resources are consumed in order to respond to the request to download the requested files from the file system tree, which are typically many more than the files being modified and often the complete file system tree from the repository. Further, network resources are consumed during the period in which files are being transferred from the repository server to the user's client computer.

Traditional revision control systems therefore consume significant storage resources, network resources, and repository server resources while responding to client requests for file system trees. In addition, since many clients can be connected to a single repository server, the repository server can be further slowed by competing requests for information and therefore users can experience significant time delays in waiting for responses to requests for information. Thus, a traditional revision control system also makes inefficient use of personnel resources and consequently costs a business additional money.

It is therefore desirable to provide a mechanism by which a user's client computer need request and receive only information the client computer requires at that time, rather than file and directory information from a file system tree that is not needed by the client computer. Such a mechanism would thereby conserve repository server, network, client, and personnel resources. It is further desirable that such an improved mechanism be capable of integration in traditional revision control environments, to avoid costs associated with migration from one repository server to another.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide for efficient usage of revision control system resources by providing a client-based file system tree based on managed cache resources. The managed cache resources include both a persistent, disk-based cache that maintains copies of requested file data from a repository server and an ordered tree data structure based metadata cache for tracking file metadata across revisions. Embodiments of the data cache include copy-on-write functionality for modified files, so that two copies of a file system tree need not be maintained by the client computer. Embodiments of the present invention further only maintain data related to files specifically requested by a user in the data cache. Should the user modify contents of a file, embodiments of the present invention will make a copy of that file that includes the modifications made to that file. Embodiments of the present invention further track a range of versions of the file system tree for which particular file versions are applicable, so that unnecessary downloading to the client of unchanged files is avoided. Embodiments of the present invention also maintain information downloaded from the repository server in a hash-based single instance storage, so that duplication of files stored on a client system is minimized.

Through the use of these managed cache resources, revision control system resources are conserved. File data and metadata are only requested from a repository server when needed. Only a single version of a file is maintained until a modification to that file is made. But the client maintains access to the entire file system tree upon demand.

Revision Control System Environment

A revision control system is a centralized system for sharing information among a group of users of that information. Revision control systems are designed to maintain historical copies of all source code and other relevant artifacts used to build the software or hardware project throughout the life of the project. A repository server provides access to a central store of data called a repository. Typically, repository servers structure an associated repository in one of a variety of database formats specific to the vendor of the repository server. The repository stores information for a project in the form of a file system tree within the repository. Client computers can access the repository via the repository server and can read and write files that are members of the file system tree in a controlled manner.

Figure 1:
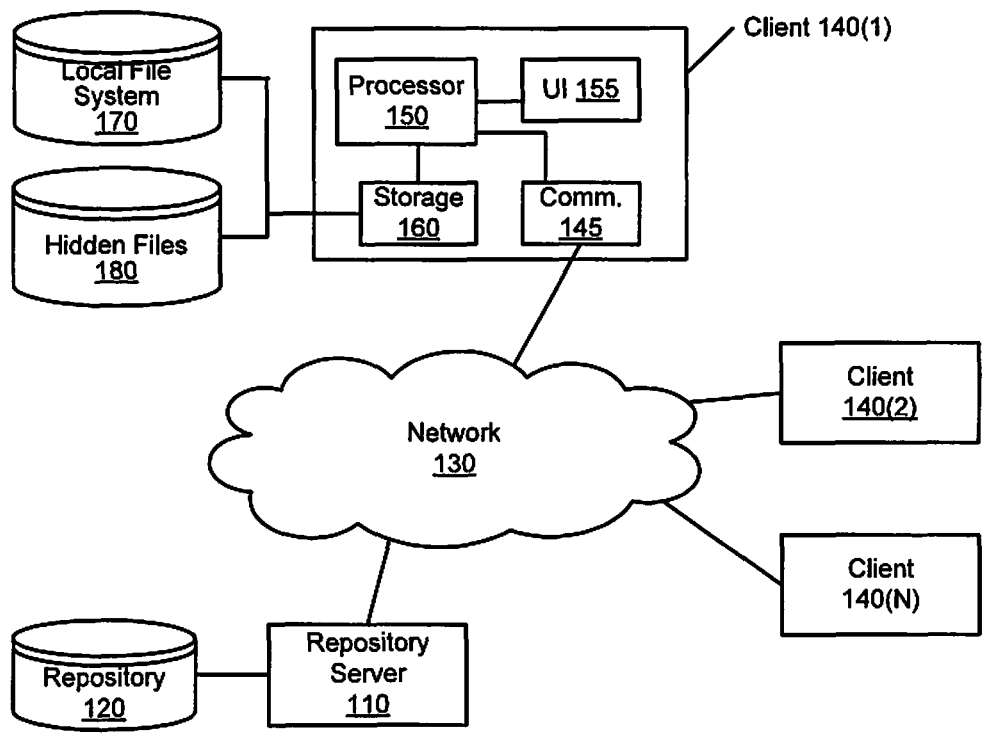
FIG. 1 is a simplified block diagram of a revision control system network usable by embodiments of the present invention.

FIG. 1 is a simplified block diagram of a revision control system network usable by embodiments of the present invention. A repository server 110 is coupled to one or more storage volumes that provide storage space for repository 120. For each project serviced by repository server 110, a file system tree is stored in repository 120. In a typical revision control system, whenever a change is made to one or more files or directories in the file system tree, a new state, or revision of the file system tree is created. Each revision of the file system tree is assigned a unique number that is one greater than the number of the previous revision. In some revision control systems, the revision numbers apply to the entire file system tree and not to individual files. A revision therefore represents an atomic bundle of changes, preventing access to an inconsistent intermediate state where only some files have been changed. A revision number refers to an entire tree, which is an associated state of the file system tree after a change has been made to that tree. The number of changes made to a particular file in a file system tree does not necessarily equal the revision number of the file system tree, which is actually the revision number by which all files at a particular state of the file system tree are referenced.

Repository server 110 is coupled to a network 130 that provides communication with one or more client computers 140(1)-(N). It should be noted that there can be more than one repository server coupled to a network 130 that are accessible to the plurality of client computers. It should also be noted that network 130 is not restricted in type and can be, for example, a local area network, metro area network, or wide area network, or a combination thereof. Further, network 130 is not limited as to protocol. In other revision control environments, a client and repository server can be located on the same physical computing equipment, thereby eliminating the need for a network connection between the client and the repository server. In still other revision control environments, a client computer can access a repository directly, without going through the repository server as an intermediary.

A client computer can include a number of modules to facilitate interactions with the revision control system. For example, a communication module 145 can provide bidirectional communication between client 140 and repository server 110. Such communications can be provided in a vendor-specific form expected by repository server 110 (e.g., by using an appropriate application program interface [API] or vendor-modified web-based distributed authoring and versioning [WebDAV] extensions). Communication module 145 can be coupled to a processor module 150 that provides a variety of client-based revision control system functionality, as described more fully below. Processor module 150 can further be coupled to a user interface 155 that permits user interaction with the various revision control system functionality. Processor module 150 can also be coupled to a storage module 160 that permits storing and access to local copies of the file system tree 170. In a typical revision control system, not only is a read/write local version of the file system stored (170) but also a hidden, read-only version of the file system tree (180) that maintains an original form for a particular revision downloaded from the repository.

In a typical revision control system, if a user wants to make changes to files in a repository, the user first checks out a copy of the file system tree, or a portion of the file system tree, onto the user's client computer local hard drive (e.g., local file system 170 and hidden file system 180). The user can then edit the local copy of the files (170) using an appropriate editor through user interface 155. When the user is satisfied with the changes, those changes can be committed back to repository 120. In order to perform a commit, the client system can scan through the local copy of the file system tree to find files that have been changed and then the client system uploads those changes back to repository server 110 to update the file system tree located in repository 120. In order to perform the local scan to find changes in the files, client 140 needs an original copy of every file in the locally stored file system tree (e.g., hidden file system 180).

Since a revision control system typically services more than one user or client system at a time, prior to allowing a commit to proceed, a client 140 should check to see if any of the locally modified files have been previously modified and committed to repository 120 by another user. Client 140 can query repository server 110 to determine if (a) a current revision of the file system tree is the same as the version locally stored on the client system, and (b) if the revision number is not the same, then determine whether the individual files that have been modified on the client have previously been changed and committed to the repository. If a file has been changed, then the client can download the committed and previously modified version of the file from the repository and perform a merge between the local version of the file and the version of the file retrieved from the repository. In some cases such a merge can be performed automatically, but in instances where conflicts between the local modifications and those previously committed to the repository are likely, user interaction with the merge is required.

Once a commit can proceed, the modified versions of the files are provided to repository server 110, which then saves the modified versions of the files in repository 120 and increments the revision number of the file system tree. In addition, metadata can be provided by the client to the repository server, indicating, for example, the changes that were made and why those changes were made. In turn, repository server 110 tracks and stores the metadata provided by the clients in association with the revision number.

A typical repository server 110 provides the following functionality: responding to requests to read data stored in repository 120, responding to requests for information about files and or file system tree versions (e.g., metadata), and responding to commits provided by clients 140. In addition, a repository server may also track the identity of one or more users who are currently editing a file. A repository server may also, in certain circumstances, allow only one user to access a file for editing at a time (e.g., by assigning a lock to a file). A repository server may also be configured to inform users of the repository server about a commit being made to a particular file, thereby enabling those users to update their local file system trees to include the new version of the file.

As stated above, an initial step for a user in making modifications to a file system tree is to download all or part of a file system tree from a repository during the "checkout" process. Checking out a file system tree is resource intensive. The transfer of file data across the network consumes bandwidth on both local area and wide area network connections. A checkout request also consumes resources on the repository server in order to respond to the request. A checkout request also consumes computing resources on the client as well as storage resources required to store two versions of the checked out file system tree. Checking out an update to a local file system tree requires fewer resources, because fewer files typically will be exchanged, but updates involve bidirectional communication between the client and the repository server to determine those files that should be updated to the client computer.

Typically, a user may only look at approximately 10% of the files checked out using a traditional revision control system and may further edit only 1% of those files. Further, the total size of the files in the repository file system tree may be very large, especially for projects having large binary files such as images, 3D models, and audio or video clips. This issue is compounded if a user of a client system wishes to work on multiple file system trees, wherein data for each tree must be downloaded and stored by the client. It is therefore desirable to have a mechanism for downloading only those files needed rather than the entire file system tree or significant portions thereof. While traditional revision control systems may have a mechanism for selecting a subset of files to download, such selection is labor intensive and error prone (e.g., file selection is manual and if too few files are downloaded, then the selection process needs to be repeated later). In addition, it is desirable that such a mechanism not require going to a different revision control system in order to realize the benefits. There are significant costs associated with changing a repository (e.g., migration [which can take weeks], possible lossy conversion of metadata, compatibility issues between the old and new system and training issues).

Client-Based Caching

Embodiments of the present invention provide a solution to the above-listed problems by allowing a user to view and edit files from traditional revision control system repositories without first making a copy of all the files in the repository file system tree on the user's local hard drive. Only file data that is actually viewed or edited will be downloaded from the repository server to a client's system. On the other hand, a user can always have access to an entire repository file system tree at no extra costs in storage or network bandwidth. Embodiments of the present invention use a copy-on-write file system methodology, so that when a user edits a file, a copy of the file is edited and not the downloaded original. Embodiments of the present invention maintain a persistent cache of all file system tree data accessed by the client and a cache of associated metadata. The persistent cache is maintained on local disk storage of the client and therefore when a system is powered down, the data in the persistent cache is not lost.

Figure 2:
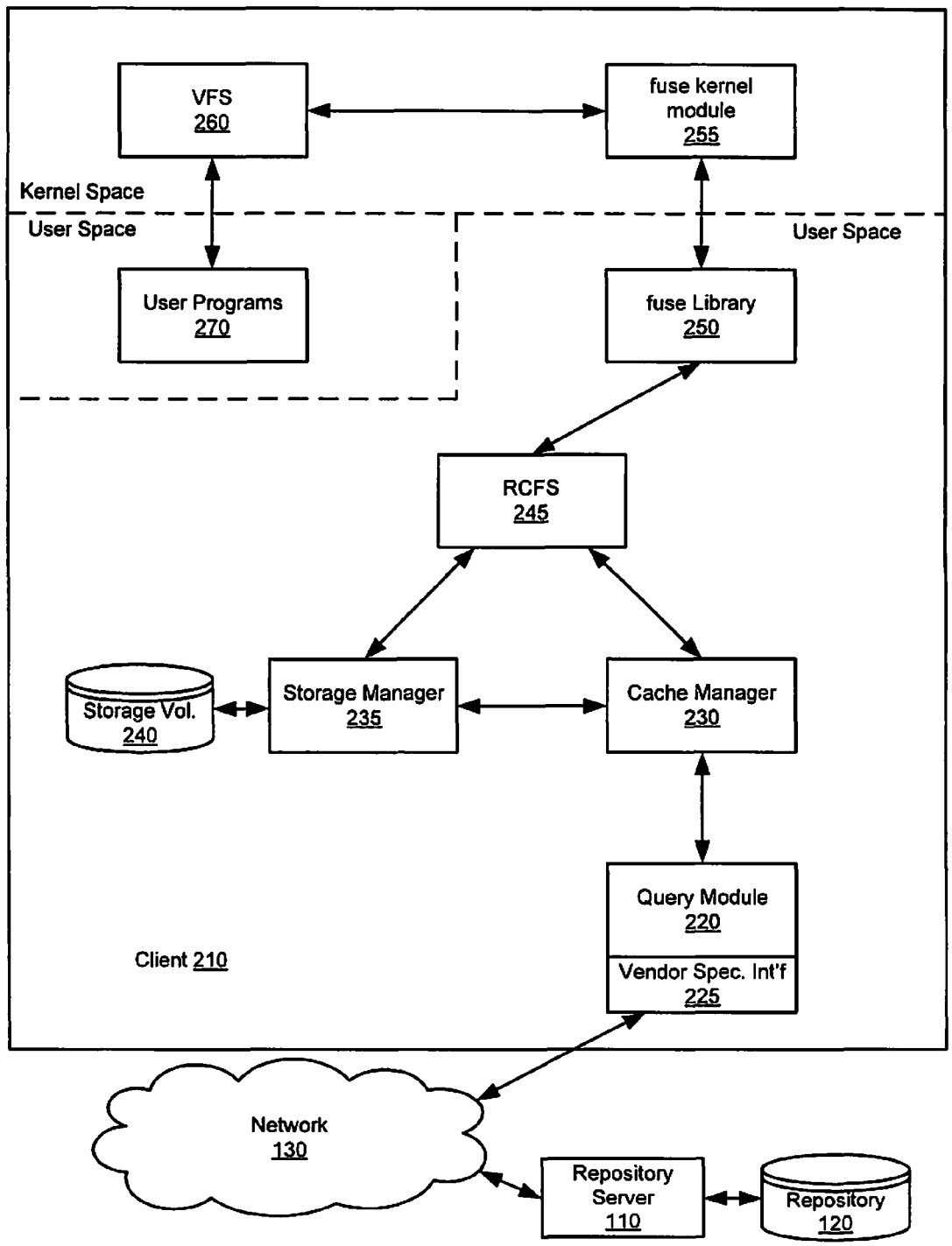
FIG. 2 is a simplified block diagram illustrating components of a client computer employing embodiments of the present invention.

FIG. 2 is a simplified block diagram illustrating components of a client employing embodiments of the present invention. A client 210 is coupled to a network 130 that is in turn coupled to a repository server 110 associated with repository 120. Client 210 communicates with repository server 110 via a query module 220 that incorporates a vendor-specific interface 225 associated with the specific repository server. The query module 220 and vendor-specific interface 225 present a standard set of operations and queries for interfacing with a repository server 110. A client 210 can have a plurality of query modules 220 coupled with associated vendor specific interfaces, each configured to communicate with a different vendor's repository server.

Query module 220 is configured to exchange information with a cache manager 230. As will be discussed more fully below, cache manager 230 maintains information about locally-stored (cached) copies of files from repository server 110 and can provide that information to revision control file system (RCFS) 245 upon request by RCFS 245. In addition, if a locally-stored version of a requested file is not available, cache manager 230 can request download of that file's information (e.g., data or metadata) from repository server 110 via query module 220. Upon receipt of file information from the repository server, the cache manager can provide the file information to RCFS 245 and can provide file data to storage manager 235 for storing in a persistent cache area located on storage volume 240 or store file metadata in a separate cache.

Storage manager 235 is responsible for maintaining storage volume 240. Embodiments of the present invention can store storage volume 240 as a container file in a larger file system. Alternatively, storage volume 240 can be stored in a dedicated storage device (e.g., one or more hard drives, solid state drives, and the like). As will be discussed more fully below, storage volume 240 can include both the cached copies of original files received from repository server 110, as well as modified files provided by RCFS 245. The cached files can be maintained in a hash-based cache that is part of the storage volume. By using a hash-based file identification system, storage manager 235 can also provide cache storage as a single instance data store, in which only one copy of file contents corresponding to a hash value need be maintained. Storage manager 235 further provides a mechanism for tracking most recently used files in the cache in order to enable freeing cache storage resources upon demand by deleting files that have remained unused for a prolonged period of time. Embodiments of the present invention further provide for storing cached file data in compressed form in order to conserve storage resources. Storage manager 235 also maintains copies of files modified by RCFS 245 in uncached storage that is not subject to deletion for lack of use.

As illustrated, revision control file system 245 is a user-space file system process that provides not only a set of standard file system operations, but also a set of operations specific to communicating with a revision control system (e.g., a repository). RCFS 245 is configured to communicate directly with both cache manager 230 and storage manager 235. For operations requiring access to information from repository server file system trees, RCFS 245 communicates with cache manager 230. For operations in which RCFS 245 modifies files or accesses modified files, then RCFS 245 communicates directly with storage manager 235.

As a user-space process, RCFS 245 is further configured to communicate with a file system interface library. As illustrated in FIG. 2, for a Linux-based operating system, RCFS communicates with a fuse kernel module 255 (e.g., fuse.ko) via a fuse library 250 (e.g., library libfuse.so). As will be understood by a person of ordinary skill, FUSE (also known as "Filesystem in User Space") provides for implementation of a fully functional file system, such as RCFS, as a user space program. The fuse library 250 is an application program interface (API) between the user space program and the fuse kernel module. The fuse kernel module 255 in turn communicates with a Linux virtual file system switch (VFS) 260 that is configured to provide access to all files in any file system in the Linux environment. VFS is a layer of code that implements generic file system actions and directs requests to specific code to handle the request. VFS 260 is configured to communicate with a variety of available file systems, including, for example, the ext2fs file system.

VFS 260 in turn provides communication with programs present in the user space. User programs 270 can include, for example, one or more editors, viewing utilities, client software specifically developed for RCFS 245, or web servers.

FIG. 2 illustrates a client-based caching system of embodiments of the present invention in a Linux operating system environment. Embodiments of the present invention are not limited to a particular operating system, and through interaction with operating system specific modules in the place of modules 250, 260 and 270 can be employed in a variety of different operating system environments (e.g., MICROSOFT WINDOWS).

Storage Manager Details

Figure 3:
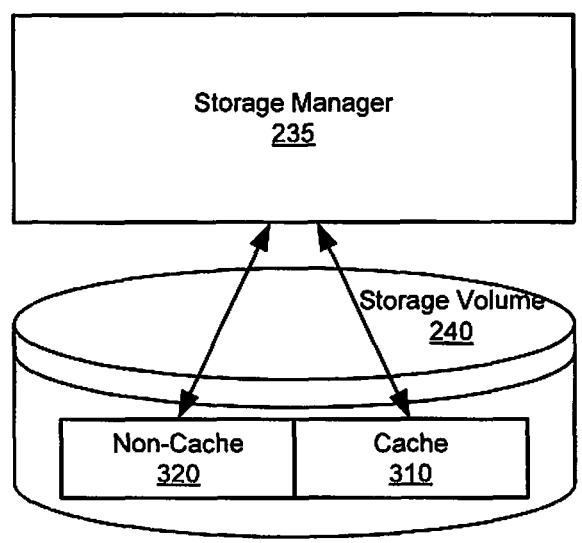
FIG. 3 is a simplified block diagram illustrating storage managed by a storage manager, in accord with embodiments of the present invention.

FIG. 3 is a simplified block diagram illustrating storage managed by storage manager 235, in accord with embodiments of the present invention. As stated above, storage manager 235 maintains a storage volume 240. The storage volume contains both cached data 310 and non-cached data 320. Information stored as cached data includes original files downloaded from a repository server. Additional cached information can include changesets (i.e., a list of files modified at a particular revision number and associated metadata). Cache data is tracked on a most recently used list in order to aid in evicting old data in order to make room for new data within the storage volume. Information stored as non-cached data (320) typically includes modified files provided by RCFS 245. Non-cached data will not be evicted from storage volume 240. Instead, non-cached data will be maintained until a user directs RCFS to delete such data.

Figures 4A, 4B:
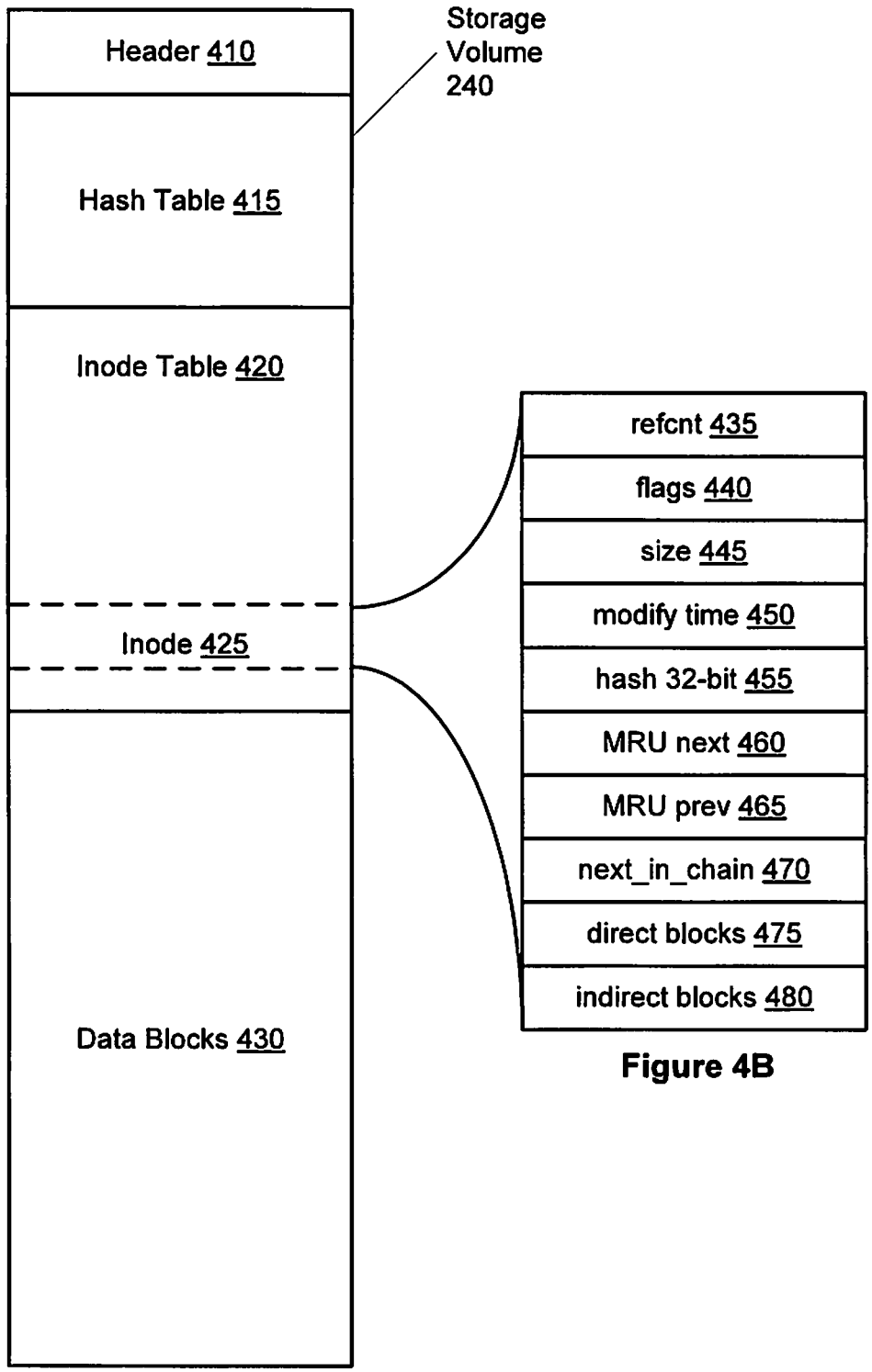
FIG. 4A is a simplified block diagram of the structure of a storage volume as maintained by the storage manager, in accord with embodiments of the present invention.
FIG. 4B is a simplified block diagram illustrating contents of an inode stored in an inode table of the storage volume, in accord with embodiments of the present invention.

FIG. 4A is a simplified block diagram of the structure of storage volume 240 as maintained by a storage manager in accord with embodiments of the present invention. Embodiments of the present invention can provide storage volume 240, for example, as an allocated file within a standard file system or can provide storage volume 240 in a dedicated storage device. A header 410 is illustrated at the beginning of storage volume 240. Header 410 provides identifying information of the storage volume, including, for example, a size of hash table 415 and a size of inode table 420.

A hash table 415 is also provided in storage volume 240. Hash table 415 provides a mapping of hash indexes to associated inode numbers. The hash index of a file is determined using a cache key that uniquely identifies a file stored in the storage volume, as will be discussed more fully below. Due to limitations in the length of hash index numbers, only a portion of the hash from a cache key is used and therefore multiple files can correspond to the same hash index. Thus, an entry in the hash table refers to an inode corresponding to a first file that corresponds to the entry in the hash table. As will be discussed below, subsequent file inodes that have the same hash index are linked to the first file inode in a chain.

Inodes corresponding to files stored in storage volume 240 are provided in inode table 420. Inodes provided in inode table 420 are similar in purpose to those provided in a "standard" file system with differences included to enable the hashing and caching features of storage volume 240.

FIG. 4B is a simplified block diagram illustrating contents of an inode 425 stored in inode table 420. Inode 425 includes a refcnt field 435 that provides a number of references made to a file. If a file is part of storage volume 240, the file has a refcnt greater than or equal to one. If the file is being used (e.g., the file is locked or being edited), the refcnt value increases by one for each reference. If the refcnt for a file equals one, and that file is cached data, then storage manager 235 is free to evict that file from the storage volume if space needs require the file to be evicted. This is because the file is only being referenced by the storage volume itself, and has no other references.

Inode 425 further includes a field available for flags 440. Flags 440 can provide a variety of information to storage manager 235 including, for example, whether the inode is associated with a file, directory, or a symbolic link, and whether the inode reference is a cache entry file. Since storage volume 240 can include both cached and non-cached files (e.g., files provided by RCFS 245), a flag is used to distinguish between both types of files. A size field 445 is also provided to indicate the size of a file associated with the inode. A modified time field 450 is provided that indicates when the associated file data was last modified, either by another user storing the file data on the repository server (prior to being downloaded to the local system) or by RCFS 245.

The following four fields illustrated in FIG. 4B are found only in inodes corresponding to cache entry files in storage volume 240. A 32-bit representation of the hash of the cache key for the file is included in field 455. This can be used to detect hash table collisions with other inodes or to locate an inode's corresponding hash table entry. It should be noted that a full representation of the cache key can be stored with the file data itself in an associated data block 430, or within inode 425 if the file data can be included within inode 425.

As stated above, each cached file stored within storage volume 240 has an associated cache key that uniquely identifies the contents of the file. The cache key is provided to storage manager 235 by cache manager 230 and is generated from information provided by repository server 110. In general, a cache key is a tag that identifies some data stored in the cache area. For example, a cache key for a file can include information about the file such as a Boolean indication of whether data in the file is compressed, a Boolean as to whether new line indications in the file correspond to a Unix operating system or a Windows-based operating system, a checksum-based hash of the contents of the file, and an indication of the method by which the checksum was generated (e.g., MD5 or SHA-1). As another example, a cache key for a changeset can include a repository URL and a revision number.

A hash index for a chunk of data (e.g., a file) associated with a cache key is generated by taking a hash of the cache key. Since such a hash will, in general, be longer than a number of bits available for each entry in hash table 415, the hash of the cache key is then truncated to an appropriate number of bits to generate the hash index. Because of such truncation, it is possible for more than one distinct file to be represented by the same hash index, even though their cache key will be different. Additionally, two or more files (or other chunks of data) can have the same hash index because two distinct cache keys hash to a same 32-bit hash value. Storage volume 240 handles this by linking inodes of files having the same hash index.

Inode 425 also includes fields pointing to a next and previous inode in a most recently used listing of inodes (460/465). As stated above, storage manager 235 tracks usage of cache entry files in order to determine whether a file can be evicted from the cache should additional space be required. The storage manager performs this task by maintaining a most recently used listing of cache entry inodes that have a refcnt equal to one. For example, if a file A has recently transitioned to an unused state (e.g., refcnt=1) then the inode number associated with that file enters a most recently used list (e.g., a linked list having references stored in the reserved block header of storage volume 240). As time goes by, additional inode references are included in the most recently used list and the inode reference for file A progresses down the list, where the oldest files in the list are at the bottom. Should storage manager 235 require additional space, the storage manager reads the most recently used list to determine which inodes are at the bottom and deletes the data associated with those inodes and clears the inode referencing that data until the required cache space is freed. Should a file on the most recently used list become accessed while the file is on the list, the file is removed from the list until the file is no longer being used and is reinserted at the top of the list. Reference to inodes before and after a particular inode are included in the MRU next 460 and MRU previous 465 fields in inode 425.

As stated above, since only a portion of a hash of a cache key that uniquely identifies a file is available for hash indexing, multiple files may correspond to the same hash index. In order to allow reference to a next file that corresponds to a particular hash index, next_in_chain field 470 provides a reference to a next inode corresponding to a file having the same hash index. In order to locate a file having a particular cache key, storage manager 235 will determine the appropriate hash index and find the first inode corresponding to that hash index through the hash table lookup. Storage manager 235 will then examine 32-bit hash value 455 to verify whether the hashes of the cache key being searched matches the hash of the cache key associated with the inode. If the 32-bit cache key hash values match, then the cache key for the first file will be examined against the cache key being searched. If either the first file's 32-bit cache key hash value or the first file's cache key does not match the searched for cache key hash value or the cache key, respectively, then the inode referenced in next_in_chain field 470 is looked up and a similar cache key hash/cache key comparison is performed. This inspection of files down the chain of inodes is performed until a match is found for the cache key or when the chain of inodes ends (e.g., there is no match for the cache key hash/cache key and thus the file is not present in the cache).

File data for files having more data than would fit in an inode is stored in data blocks 430. Inode 425 contains pointers to direct blocks 475 that contain file data. More than one direct reference to a data block can be provided in inode 425. In one embodiment of the present invention, an inode can contain references to 13 direct blocks. Should the number of blocks containing data be so large that the list of blocks will not fit within an inode, then inode 425 provides indirect block pointers 480 for storing pointers to a data block that contains pointers to direct blocks (or other indirect blocks). In one embodiment of the present invention, an inode can contain a single indirect block pointer, a double indirect block pointer and a triple indirect block pointer in indirect block pointers 480.

Storage Manager 235, in embodiments of the present invention, provides, for example, the following functionality:
  alloc: Allocates a new inode for a file. For a newly allocated inode, the refcnt=1.
  add-ref (inode): Increases the refcnt of the indicated inode.
  release (inode): Decreases the refcnt of the indicated inode. Automatically frees the indicated inode if refcnt=0.
  get_ptr (inode): Retrieves a pointer to an inode.
  get_flags (inode)/set flags (inode): Retrieves or sets flags field 440 in inode.
  get_size (inode): Retrieves information in size field 445 of inode.
  grow (inode)/shrink (inode): Modifies size field 445 of inode and allocates or frees associated data blocks.
  read (inode)/write (inode): Accesses data blocks referenced by inode.
  cache_add (index key, inode): Designates an inode as a cache entry associated with index key.
  cache_find (index key): Returns an inode corresponding to the index key. Further increments refcnt, thereby making the inode non-evictable (e.g., sets refcnt≥2).

These operations can be presented by storage manager 235 to both cache manager 230 and RCFS 245 through an application program interface. It should also be understood that the described functionality can be merged into one or more functional calls and that that names of the operations are not restricted to those listed.

Figure 5:
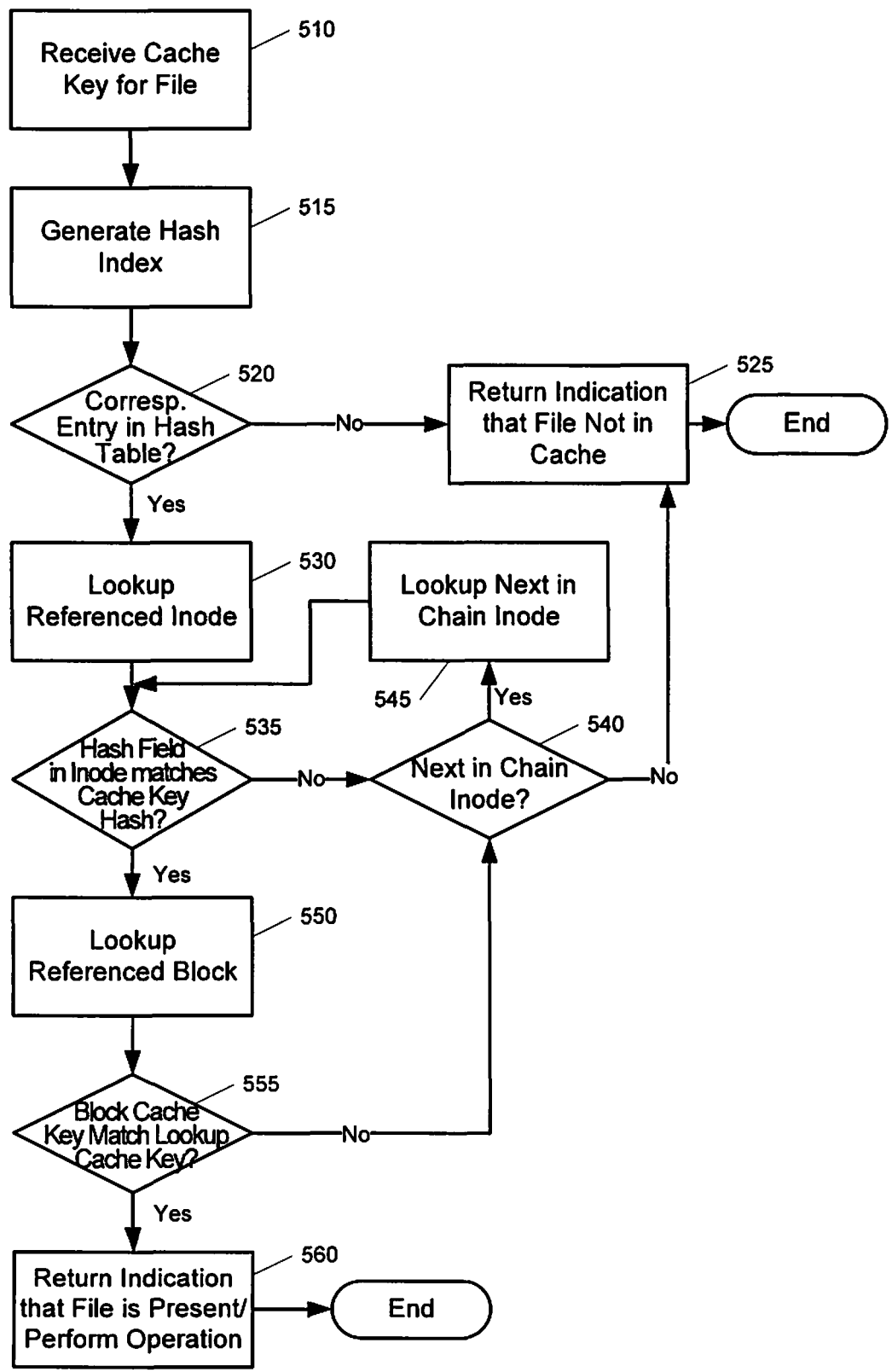
FIG. 5 is a simplified flow diagram illustrating a process for determining whether a file being sought is currently present as a cache entry of a storage volume, in accord with embodiments of the present invention.

FIG. 5 is a simplified flow diagram illustrating a process for determining whether a file being sought is currently present as a cache entry of storage volume 240, in accord with embodiments of the present invention. Storage manager 235 can receive a cache key corresponding to a file from cache manager 230 (510). From the cache key, storage manager 235 can generate a corresponding hash index (515). As discussed above, the corresponding hash index will be a truncation of a hashing of the received cache key, and therefore may correspond to more than one file. Thus, a determination must be made for whether the sought after file is actually present.

Hash table 415 is then examined to determine if there is an entry corresponding to the generated hash index in the hash table (520). If there is no corresponding entry in the hash table, then storage manager 235 returns an indication to cache manager 230 that the sought after file is not present in the cache (525), and the process ends. If there is a corresponding entry in the hash table, then storage manager 235 looks up the inode referenced in the hash table entry (530). The hash field in the corresponding inode is then examined to determine if the hash of the cache key matches that stored in the hash field (535). If the inode hash field does not match the cache key hash, then the inode is examined to determine if there is a next-in-chain inode referenced in field 470 (540). If there is no next-in-chain inode, then an indication is returned if the file is not in the cache (525). If there is a next-in-chain inode, then the next-in-chain inode is looked up (545), and the process of examining the hash field in the next-in-chain inode is performed as before.

If a determination is made that the hash field in an inode does match the cache key hash, then a lookup is performed on a referenced block containing the corresponding file data (550). A determination is then made as to whether the cache key stored in the data block matches the cache key of the file being sought (555). If not, then the next in chain inode is examined as before (540). If the block cache key does match the cache key of the file being sought, then an indication is returned that the file being sought is present or further operations are performed on the file, as requested (560). Upon receiving this information from the storage manager, the cache manager makes a determination as to whether information requested by the RCFS can be provided from storage volume 240 or must be downloaded from repository server 110.

Cache Manager Details

Cache manager 230 functions as a gate keeper between a client computer and the repository server. In response to a request for file information associated with a file in a file system tree made by revision control file system 245, cache manager 230, in conjunction with storage manager 235 makes a determination as to whether the requested file information has already been downloaded to the client. If the file information is already stored locally, then the cache manager provides the locally stored file information to the RCFS. If the file information has not already been downloaded, then cache manager 230 requests an appropriate version of the file information from repository server 110 via a corresponding query module 220. File information can include not only file data (stored in the cached file system maintained by the storage manager), but also file metadata stored by the cache manager.

Figure 6:
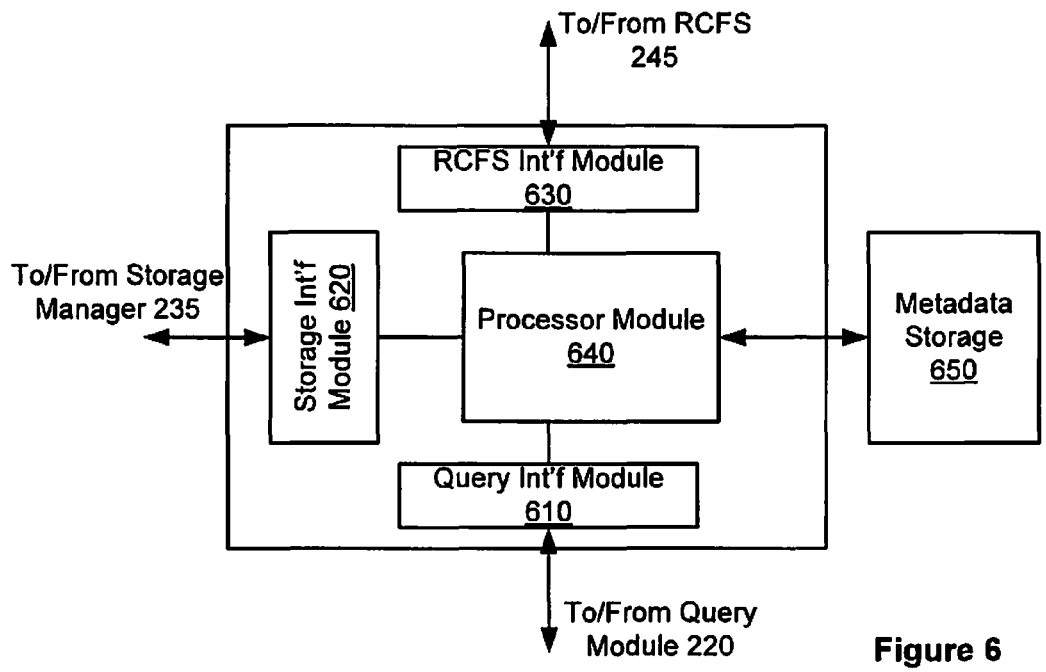
FIG. 6 is a simplified block diagram illustrating functional modules of cache manager, in accord with embodiments of the present invention.

FIG. 6 is a simplified block diagram illustrating functional modules of cache manager 230, in accord with embodiments of the present invention. As illustrated, cache manager 230 is configured to communicate with query module 220, storage manager 235 and revision control file system 245. A query interface module 610 is configured to provide communication between cache manager 230 and query modules for responding to one or more repository servers. Embodiments of the present invention provide a single interface protocol between query interface module 610 and all query modules 220 (e.g., a communication API), leaving the associated query module to perform conversion of those commands to a vendor-specific protocol.

Cache manager 230 also provides a storage manager interface module 620 for communication between cache manager 230 and storage manager 235. Embodiments of the present invention provide such communication through an application programming interface supporting the operations provided by the storage manager. Similarly, cache manager 230 incorporates a revision control file system interface module 630 to interface with RCFS 245. Each of the interface modules 610, 620, and 630 are coupled to a processor module 640 that manages and performs processing related to cache manager 230's functions. Processor module 640 is further coupled to metadata storage 650, in which file metadata is stored.

A cache manager 230, in embodiments of the present invention, provides the following basic functionality:

get_file_info (URL, revision number): In response to a URL of a file and a revision number of the associated file system tree, get_file_info will return various metadata information about the specified file, including one or more flags specifying whether the URL is associated with a file, directory, or symbolic link, and whether the file is an executable, binary, or text file, for example. Size and the last modify time for the file can also be returned. If the information is already locally stored, for example in metadata storage 650 or in an associated inode in storage volume 240, cache manager 230 will return the locally stored information in response to the request. If the metadata is not already locally stored, then cache manager 230 can request the information from the repository server associated with the URL and the file system tree stored thereon associated with the revision number.

get_file_checksum (URL, revision number): This command returns a checksum hash of the file specified. Cache manager 230 first checks to determine whether the hash is locally stored (e.g., in metadata storage 650), and if not then requests a download of the checksum information from the associated repository server. If the associated repository server is configured to generate checksums, then the repository server returns the requested checksum. If the associated repository server is not configured to generate checksums, then file data can be supplied to cache manager 230 by the repository server and cache manager 230 generates the checksum. Checksums can be generated by any standard hashing algorithm (e.g., MD5 or SHA-1).

enum_files_in_directory (URL, revision number): Returns a list of filenames in the directory specified at URL. This information is typically used as an aid in finding a file and in building a file system tree directory structure in storage manager 235.

get_file (URL, revision number): Returns file data for the requested file. Again, initially checks to determine whether the requested file data is locally stored, and if not then requests the file data from the repository server specified in the URL.

As indicated above, cache manager 230 and storage manager 235 use a cache key to determine whether a requested file is already present in local storage. Cache manager 230 can store the cache key as metadata (e.g., in metadata storage 650). The cache key for a specific file can include information such as the checksum or hash of the file data as received in response to the get_file_checksum command along with information about the type of checksum represented by that hash.

Figure 7:
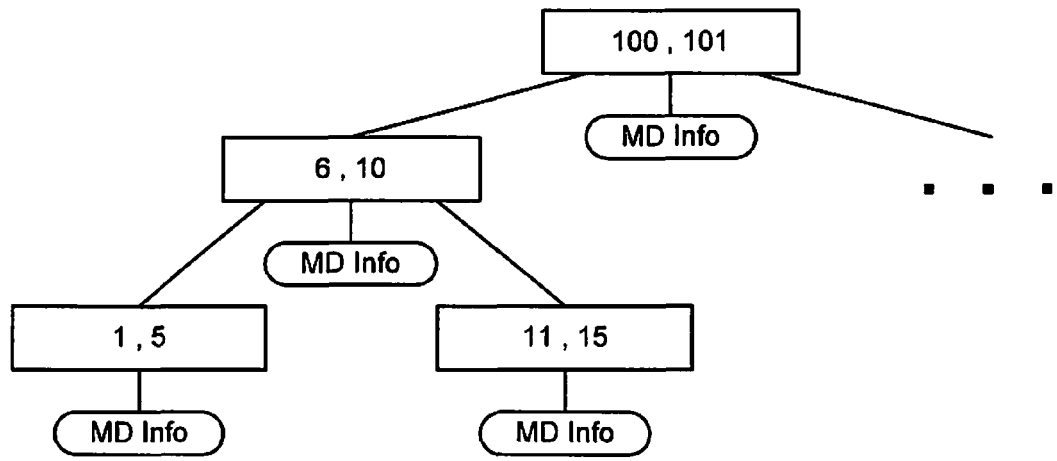
FIG. 7 is a simplified block diagram illustrating an example of a memory structure usable for storage of metadata by a cache manager, in accord with embodiments of the present invention.

FIG. 7 is a simplified block diagram illustrating an example of a metadata tree memory structure usable for storage of metadata by a cache manager in accord with embodiments of the present invention. In the illustrated example, cache manager 230 stores file metadata in an ordered tree data structure, such as a binary search tree structure (e.g., red-black tree, AVL tree, and splay tree), 2-3-4 tree, B-tree, B+-tree, and the like. Keys in the metadata tree are a URL for a corresponding file along with ranges of revision numbers over which the associated information is valid. Such a structure is used because file metadata is ordered data, wherein the ordering is provided by the revision number of the file. Building of such an ordered tree data structure is well understood in the art. One difference from traditional ordered tree data structure operations relates to an insertion algorithm for the metadata tree. For example, if cache manager 230 wants to insert metadata associated with a revision 101 of information at a URL, the cache manager checks metadata associated with the revision 100 to determine if the information is the same. If the information is the same, then revision 101 is added to the range key (e.g., the range is expanded to include revision 101). If the information associated with revision 101 is different from that at revision 100, then a new node is created in the metadata tree for revision 101. Another point of view is that adjacent nodes in the metadata tree can be merged if the URL and the associated information for those nodes is the same. That is, a node can be created for new metadata with the revision number for that metadata. Adjacent nodes in the metadata tree can be examined to determine whether the URL and the associated metadata is the same as that associated with the new node. If so, then revision range associated with the matching node can be expanded to include the revision number of the newly added node and then the newly added node can be removed from the metadata tree. For example, if an added node has an associated key that includes a range of revision numbers associated with the file, and the requested information is associated with the added node, a node in the ordered tree data structure can be examined to determine if a key associated with the examined node is within the range of revision numbers associated with the added node. If the key associated with the examined node is within the range of revision numbers of the added node, the examined node can be deleted. Similarly, if a key associated with the examined node is a range of revision numbers that overlaps with the range of revision numbers associated with the added node, the range of revision numbers of the key of the examined node can be extended to include the range of revision numbers associated with the node key of the added node. Then the added node can be deleted.

Embodiments of the present invention provide the file metadata tree as a cache. Each node within the metadata tree can be linked together on a most recently used list, similar to that discussed above with regard to the file data cache. The most recently used list provides an order in which nodes have been used in the metadata tree. Thus, if it is desired to keep the metadata tree at or below a certain number of nodes, when new information arrives, that information is first inspected to determine whether that information can be merged with an existing node, and if not, then an old entry can be removed from the tree based upon its position in the most recently used list.

Embodiments of the present invention associate information gathered about files in the metadata tree. Examples of such information include information returned by the operations get_file_info and get_file_checksum, as well as either the cache key for the associated file or the information necessary to generate a cache key.

Figure 8:
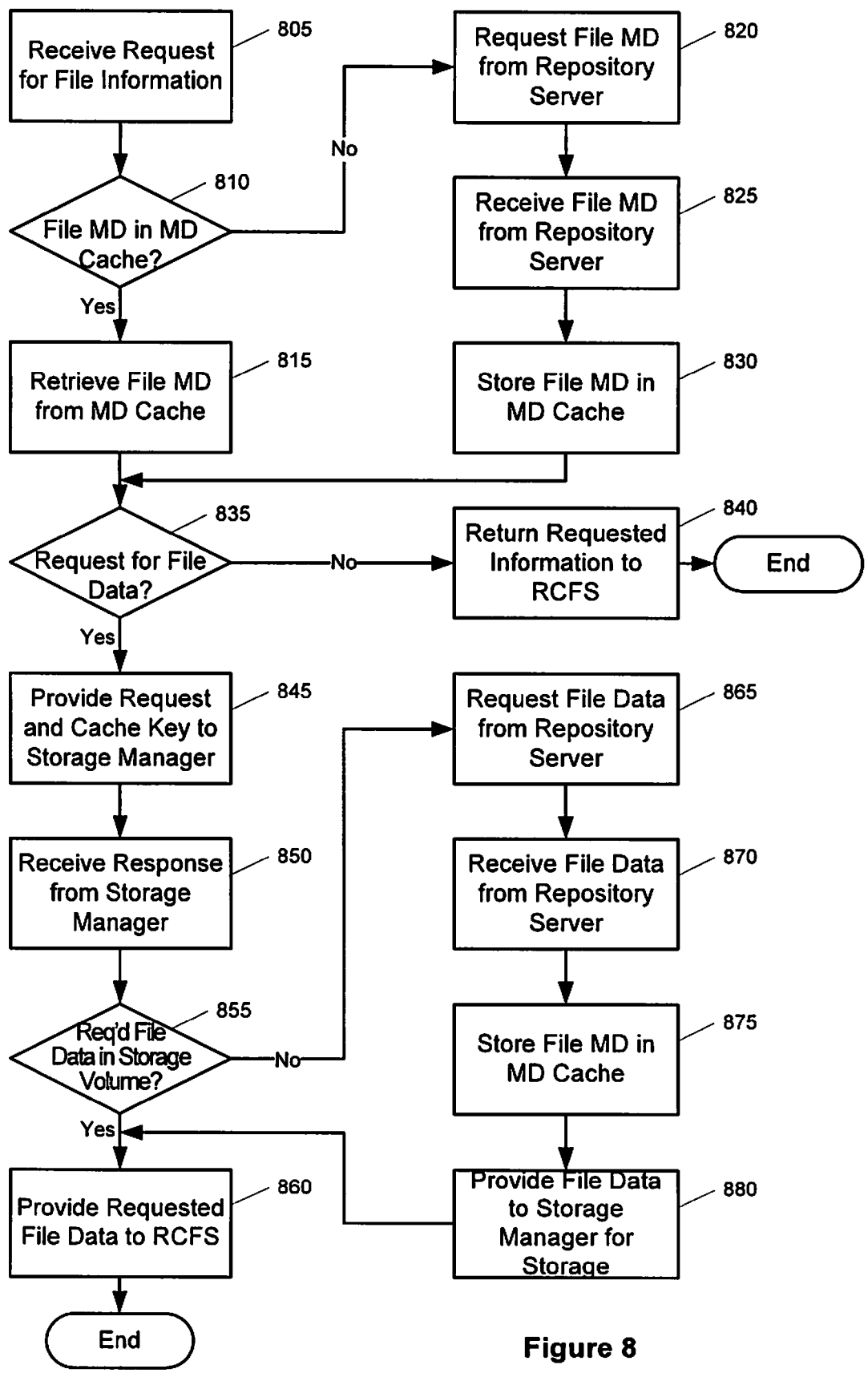
FIG. 8 is a simplified flow diagram illustrating steps performed in response to a request for file information made to a cache manager, in accord with embodiments of the present invention.

FIG. 8 is a simplified flow diagram illustrating steps performed in response to a request for file information made to cache manager 230, in accord with embodiments of the present invention. A request for file information is received by cache manager 230 from RCFS 245 (805). The file information requested can include a request for metadata type information or file data. Such a request can be for a filename at a particular path as well as for a specified revision number.

Cache manager 230 will then check to determine if metadata associated with the requested file is currently stored in the metadata cache (810). The cache manager will search the metadata tree for the specified revision number to determine if there is metadata for the requested file already stored. Such a search, based on the revision number key, can be performed using well understood tree search algorithms. If metadata associated with the requested file information is previously stored in the metadata cache, that metadata is retrieved (815). If metadata associated with the requested file information is not already stored in the metadata cache, then cache manager 230 requests metadata associated with the requested file information from a repository server 110 (820). The metadata is received from the repository server (825) along with a range of revisions over which the metadata information is valid and the metadata is stored in association with an appropriate node in the metadata cache tree (830), as discussed above. Embodiments of the present invention can also prefetch metadata associated with files in the same directory as the requested file. In this manner, the cache manager can more efficiently provide information related to those files in the event of a request for that information.

If the received request for file information is only for file metadata (835), then the requested metadata information will be returned to RCFS 245 (840) and the response session will terminate. If the request for file information is for file data (835), then cache manager 230 will provide a request and cache key to storage manager 235 (845). As stated above, the cache key or information comprising the cache key can be stored in the metadata cache. If the cache key is not stored in the metadata cache, then cache manager 230 will generate the cache key prior to providing the information to storage manager 235.

Upon receiving a response from the storage manager (850), a determination will be made as to whether the requested file data was present in the storage volume associated with the storage manager (855). If the requested file data was present in the storage volume, then the requested file data will be provided to the RCFS (860). If the requested file data is not present in the storage volume, then the file data will be requested from the appropriate repository server (865). Upon receipt of the file data from the repository server (870), metadata associated with the received file data can be stored in the metadata cache (875) and the received file data can be provided to the storage manager for storage (880). In addition, the file data will be provided to RCFS 245 (860).

Revision Control File System Details

Revision control file system (RCFS) 245 provides various file system semantics and interfaces to permit a user or a program to access files provided by storage manager 235 and repository server 110 via cache manager 230. RCFS 245 provides basic file system operations as well as specialized operations to provide access to information and data associated with local copies of repository files.

Figure 9:
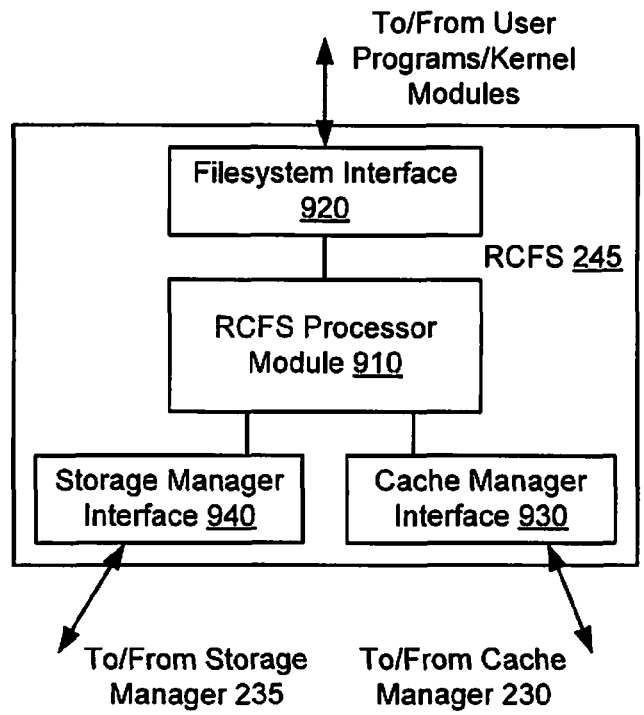
FIG. 9 is a simplified block diagram illustrating components of a revision control file system, in accord with embodiments of the present invention.

FIG. 9 is a simplified block diagram illustrating components of RCFS 245 in accord with embodiments of the present invention. As previously discussed, RCFS 245 communicates directly with both storage manager 235 and cache manager 230. RCFS 245 also communicates with user and/or kernel-based modules in providing file system functionality. An RCFS processor module 910 provides responsive processing to operations received by RCFS 245 via a file system interface 920. File system interface 920 presents RCFS 245 to user-space based programs or kernel-space based programs and utilities. As illustrated in FIG. 2, a user-space based RCFS 245 communicates to a fuse library 250 (e.g., libfuse.so) in the context of a Linux environment. In the context of other operating system environments, file system interface 920 can be modified to present appropriate application programming interface calls. Further, although FIG. 2 illustrates RCFS 245 as a user-space based program, RCFS 245 can also be a kernel-based module that communicates directly with VFS 260. Again, in such a system, file system interface 920 would be modified to present appropriate interface calls to VFS 260. An advantage of presenting RCFS 245 as a user-space based utility is that modifications to a client system's kernel need not be performed. On the other hand, a kernel-based RCFS can have speed advantages over a user-space based version.

RCFS processor module 910 communicates with cache manager 230 via a cache manager interface 930 and with storage manager 235 via a storage manager interface 940. Each of interfaces 930 and 940 provide appropriate calls to their associated destinations (e.g., RCFS Interface Module 630 in Cache Manager 230). These communication interfaces are configured for bidirectional communication with their targets in order to permit access to data associated with each target.

As stated above, RCFS provides not only a standard set of operations for a file system but also provides operations that are unique to the needs of the revision control system. A standard set of file system operations included in RCFS can include, for example, the following:
- open_file
- read_file
- write_file
- close_file
- get_file_stats
- set_end_of_file
- enum_files_in_directory
- delete_file
- create_directory
- remove_directory
- create_hard_link
- create_symlink
- rename_file
- set_executable The purposes of the above "standard" operations are self-explanatory, and are necessary operations to a read/write file system.

RCFS can also provide additional specialized commands that permit access to files located originally on the repository. Examples of such commands include the following:
- create_mount_point (path, URL): Associates the given path with a URL of a repository directory, wherein the provided path is the mount point of the repository directory.
- set_revision (path, revision number): Defines the revision number of interest for the mount point path.
- set_tracking_dependencies (Boolean): Enables dependency tracking of files accessed in the RCFS tree.
- get_dependencies: Provides a listing of the files and directories that were accessed during a period in which tracking dependencies are enabled.

In one embodiment of the present invention, the standard file system operations are similar to those found in ext2fs a traditional Linux-based file system. In such a file system, each path in the file system maps to an inode, and sometimes more than one path may map to a particular inode. Directories have inodes that contain a list of filenames and inodes of files in the directory. In order to find a file, a lookup occurs from the path stated to locate the inode, and then operations can proceed on the inode or data associated with the inode. When a directory is created, a file is formed that has no data. As files are included in the directory, a list of inodes and references to the inodes (e.g., filenames) are created in the parent directory file.

RCFS has additional commands to mount a repository in association with a directory of the file system (e.g., create_mount_point). When the create_mount_point command is used, an empty directory is formed, similar to that for creating a directory in a standard file system. RCFS provides a field in the inode associated with the mount point directory in which the URL path of the repository server and the revision number associated with the mount point (e.g., as set by set_revision) are stored. Thus, when an operation is performed on the mount point, the system will see that the directory itself is empty but there are special tags pointing to the repository server. Since the tags are indicated, RCFS queries the cache manager for the contents of the directory, rather than just providing an empty list. For example, if the enum_files_in_directory command is provided, RCFS forwards that command to cache manager 230 which returns file information about the requested directory structure. RCFS will then populate the directory structure in the local file system using the information provided by the cache manager.

RCFS populates the local directory structure only as needed. Inodes in the directory file specified by create_mount_point are allocated in response to using a command such as enum_files_in_directory. Inodes for files in the directory are allocated when using a command such as get_file_info, once such a command returns information stating whether the specified target is a file or a directory.

Figure 10:
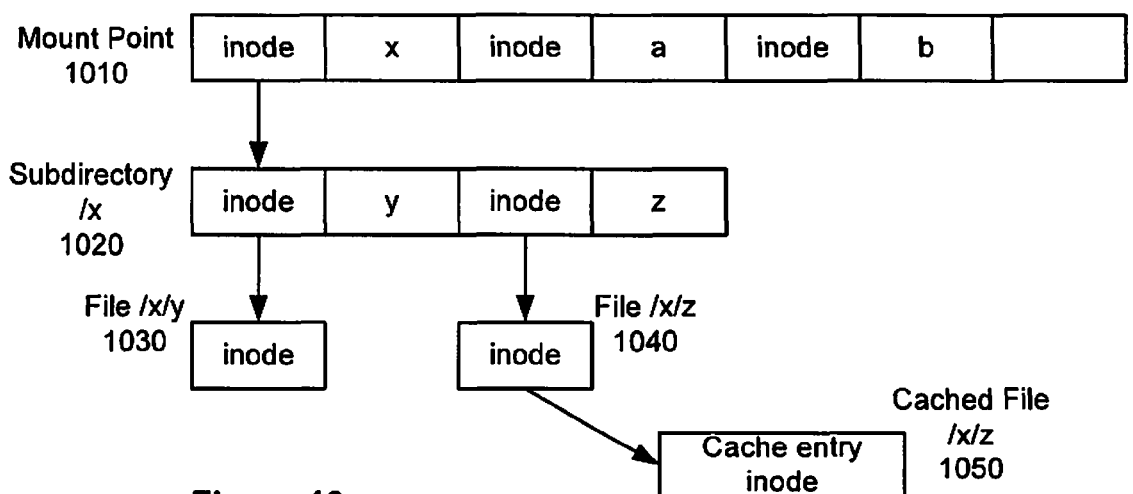
FIG. 10 is a simplified block diagram illustrating allocation and relationships between a mount point directory and subdirectories under that mount point and associated files, in accord with embodiments of the present invention.

FIG. 10 is a simplified block diagram illustrating allocation and relationships between a mount point directory and subdirectories under that mount point and associated files, in accord with embodiments of the present invention. A directory is created at mount point 1010, using, for example, create_mount_point. Initially, the directory at mount point 1010 is empty except for tags pointing to a repository server path and associated revision number. In order to perform any operations on files associated with that mount point, a listing of files is acquired by submitting an enum_files_in_directory command to cache manager 230. Cache manager 230 returns a listing of directory contents as found within the cached area of storage manager 235, if such information exists, or the listing from repository server 110. Upon receiving this information, RCFS populates the directory file at mount point 1010 with a listing of inodes and associated filenames. The listed inodes are allocated to RCFS in the non-cached storage area provided by storage manager 235. At this point, none of the inodes themselves are populated, and will not be populated until a request is made for that information. For example, if information about files within subdirectory /x is required, an enum_files_in_directory of subdirectory /x can be performed and the information stored within the inode associated with subdirectory /x at subdirectory 1020. As illustrated, the information provided is a list of inodes associated with references /x/y and /x/z.

Subsequently, if information about file /x/y is desired, RCFS can provide a get_file_info command to cache manager 230, and the returned information can be stored in inode 1030 associated with file /x/y. It should be noted that at this time the inode is only associated with the requested information, and not with file data. On the other hand, if a read_file command is provided for a file associated with the inode referenced as /x/z, an inode 1040 is created for the information related to that file and that inode can be linked to a cache entry inode 1050. Thus, a read operation will be satisfied by referencing the cache entry inode associated with the file. If, however, a user desires to modify file /x/z, then the data referenced by cache entry inode 1050 is copied to inode 1040 (or one or more data blocks associated with inode 1040) and subsequent reads and writes to file /x/z are satisfied by the copy and not the cache entry.

In this manner, inodes within the file system do not get populated with file data until that file data is required. For example, if a file is merely being deleted, then access to the data found in the cache manager is not required. If one needs read access to the data, then an RCFS inode is linked to the cache manager cache entry inode and reads can be satisfied by the cache manager cache entry inode. RCFS provides a copy on write of data from the cache manager cache entry inode by copying data to the RCFS inode upon modification of the data, as discussed above.

Dependency tracking tracks accesses to files in the file system tree. Every time an inode is accessed, such access is tagged as a dependency. Accesses can be recorded in an expanding list of files and directories that have been accessed during a period of dependency tracking. Alternatively, tags within the inodes can be flagged for each type of dependency as needed.

A user of RCFS can also choose to store changes made to the file system tree as a checkpoint of the tree at a particular time. RCFS can store information regarding the changes in a permanent storage area, such as a checkpoint server or a persistent area of storage volume 240 or a locally available file system. A checkpoint can include a full copy of all edited files. A file system tree can be restored from a checkpoint by creating a new mount point and including all files and information in the directory tree structure necessary to support the checkpointed files and all files depending therefrom.

Figure 11:
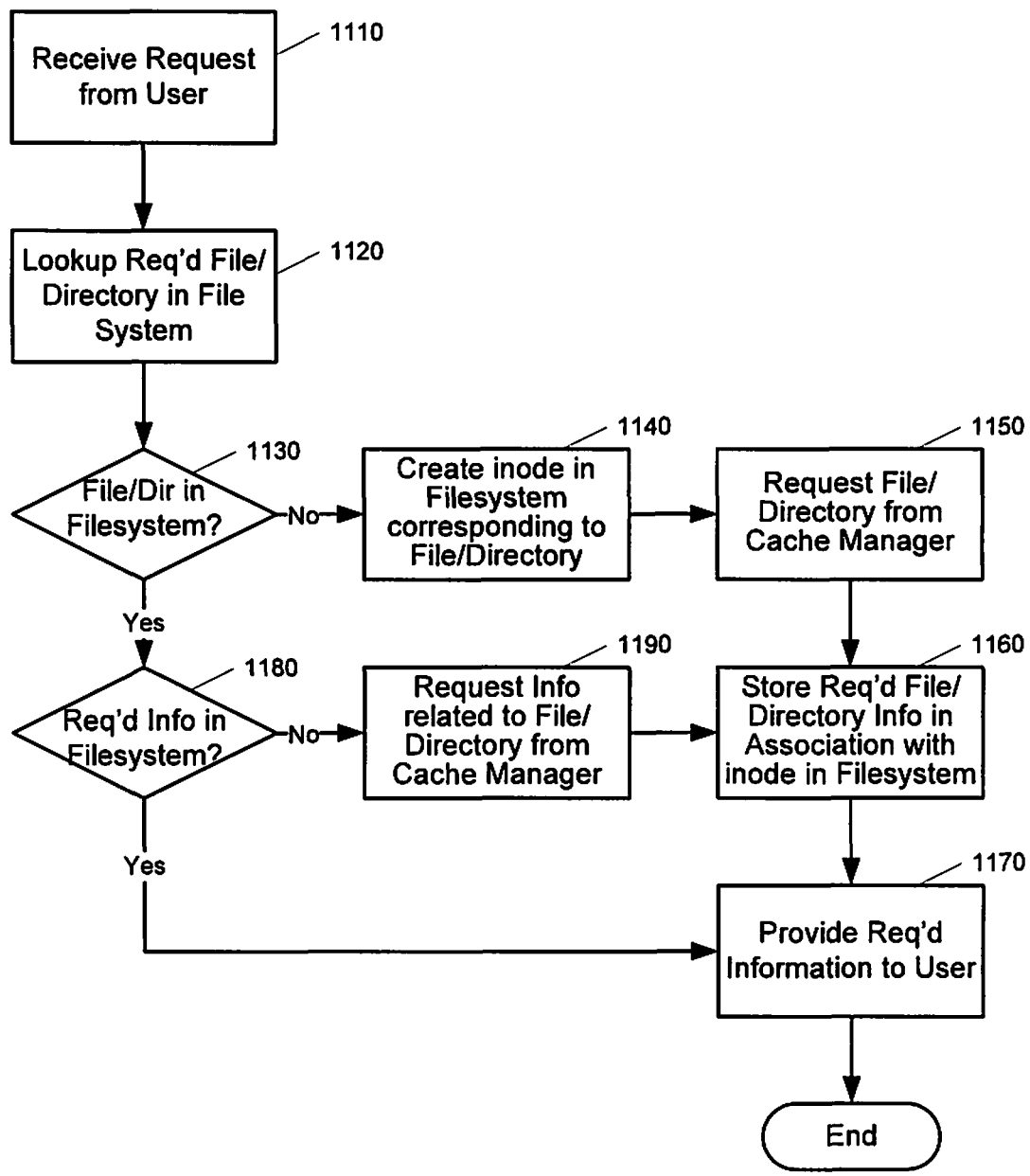
FIG. 11 is a simplified flow diagram illustrating a process performed by a revision control file system, in response to a request received from a user, in accord with embodiments of the present invention.

FIG. 11 is a simplified flow diagram illustrating a process performed by RCFS 245 in response to a request received from a user, in accord with embodiments of the present invention. A file system request is received from a user (1110). Such a request can be any file system request, including, for example, a directory lookup, a read request, and the like. Requests can be received, for example, from a program operating in user space via intermediary systems as described above and illustrated in FIG. 2 (i.e., Linux VFS and fuse).

Upon receiving the request, RCFS can perform a lookup of the requested file or directory associated with the request in the file system (1120). RCFS 245 can perform this lookup by providing one or more appropriate commands to storage manager 235 for a file system tree stored in a non-cached area of the storage volume managed by storage manager 235. Upon receiving a response from the storage manager, a determination is made as to whether the requested file/directory is already present in the file system (1130). If the requested file/directory is not present in the file system, then an inode can be created in the file system corresponding to the requested file/directory (1140). Again, this inode can be created through an appropriate command to the storage manager (e.g., alloc).

RCFS 245 can then request the desired file/directory information from cache manager 230 (1150). The cache manager performs an information lookup, as described above, first determining whether the desired information is present in the local persistent cache, and if not then requesting the information from a repository server 110. The cache manager returns the requested information to RCFS, and then RCFS can store the requested file/directory information in association with the inode created in step 1140 (1160). If the requested information is small, such information can be stored in the inode itself. If the file/directory information includes file data that is too large to be stored in the inode, then the information can be stored in a data block referenced as a direct or indirect block from the inode. The requested information can then be provided to the requesting user (1170).

If the file/directory associated with the requested information is present in the file system (1130), then an inquiry is made to determine if the requested information associated with the file/directory is present in the file system (1180). If the requested information is not present in the file system, then a request can be made for the information from the cache manager (1190). Upon receipt of the requested information, the requested information can be stored and provided to the user per previously discussed steps 1160 and 1170. Alternatively, if the requested information is already present in the file system, then the requested information is provided to the user.

In the above-described manner, the revision control file system can make visible to a user as much of the repository's file system tree as the user desires or needs to see. Not only can directory information be available to a user, but also information related to file metadata upon request. But file data associated with a file name is only stored in the file system if that data has been modified from a form originally found on the repository. The original data accessed from the repository is stored in the persistent cache and accessed by the cache manager. Through interaction with cache manager 230, if metadata and data for a particular file at a requested revision have already been downloaded to the client computer and stored in the local cache, the requested information is retrieved from the local copy in the cache rather than requesting and downloading the information from a repository server.

This interaction between cache manager 230 and RCFS 245 results in a conservation of resources of the client, the repository server, and the network coupling the client to the repository server. Client storage resources are conserved by needing to maintain only one copy of each downloaded file from the repository until that file is modified by a user of the client. Further, only a portion of the file system tree that is needed by a user is actually downloaded to the client computer, and metadata associated with file system tree files can be downloaded separately from associated data. Network resources are likewise conserved due to the reduction in the amount of data being downloaded from a repository server to a client. Similarly, repository server resources are conserved by needing to respond only to requests for smaller amounts of information, rather than needing to respond to requests for downloading entire file system trees. Since repository resources are freed up, time spent waiting for a response from the repository server is also reduced, thereby improving personnel efficiency.

An Example Computing and Network Environment

As shown above, the present invention can be implemented using a variety of computer systems and networks. An example of one such computing and network environment is described below with reference to FIGS. 12 and 13.

Figure 12:
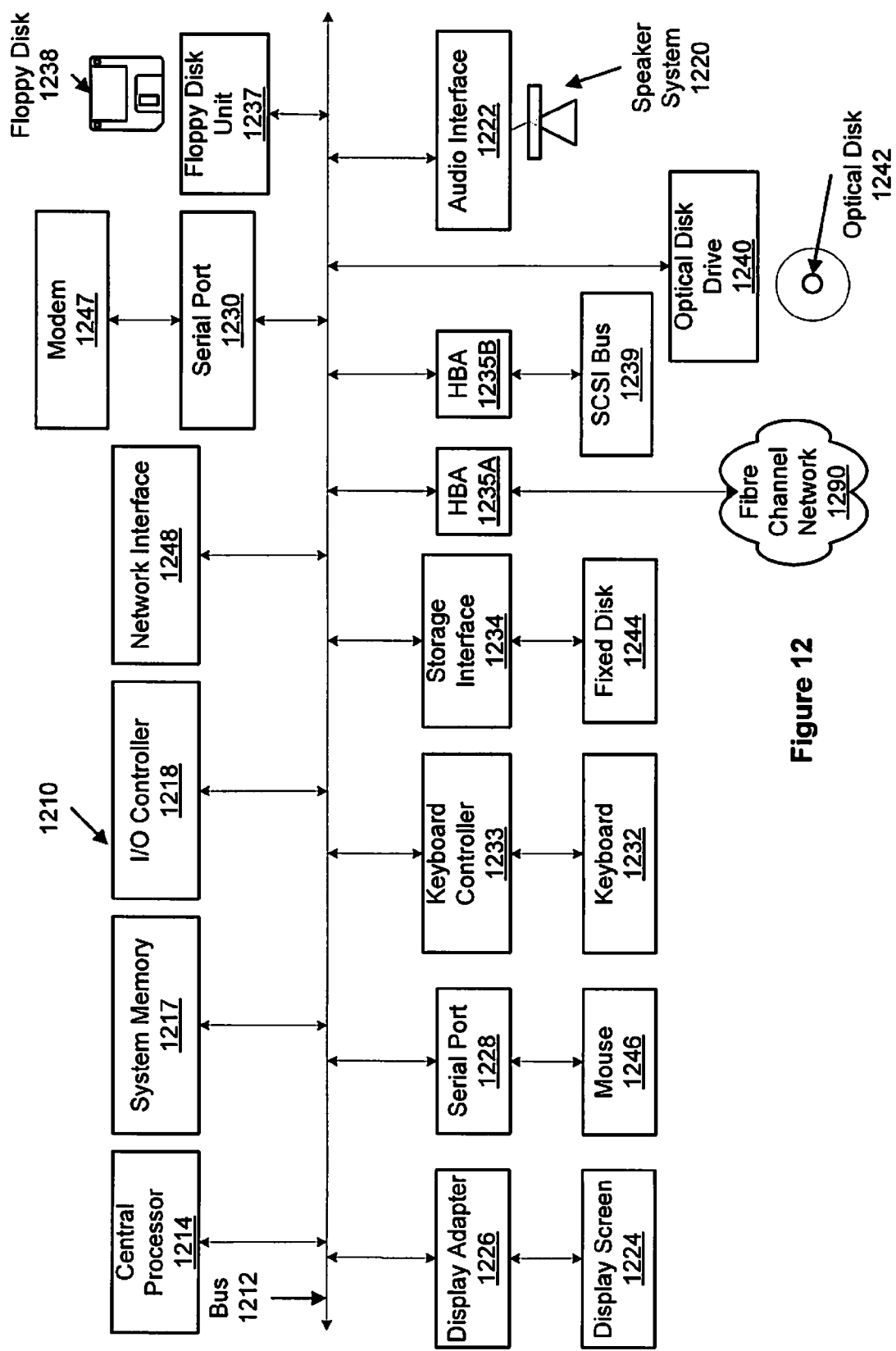
FIG. 12 depicts a block diagram of a computer system suitable for implementing aspects of the present invention.

FIG. 12 depicts a block diagram of a computer system 1210 suitable for implementing aspects of the present invention (e.g., clients 140 and repository server 110). Computer system 1210 includes a bus 1212 which interconnects major subsystems of computer system 1210, such as a central processor 1214, a system memory 1217 (typically RAM, but which may also include ROM, flash RAM, or the like), an input/output controller 1218, an external audio device, such as a speaker system 1220 via an audio output interface 1222, an external device, such as a display screen 1224 via display adapter 1226, serial ports 1228 and 1230, a keyboard 1232 (interfaced with a keyboard controller 1233), a storage interface 1234, a floppy disk drive 1237 operative to receive a floppy disk 1238, a host bus adapter (HBA) interface card 1235A operative to connect with a Fibre Channel network 1290, a host bus adapter (HBA) interface card 1235B operative to connect to a SCSI bus 1239, and an optical disk drive 1240 operative to receive an optical disk 1242. Also included are a mouse 1246 (or other point-and-click device, coupled to bus 1212 via serial port 1228), a modem 1247 (coupled to bus 1212 via serial port 1230), and a network interface 1248 (coupled directly to bus 1212).

Bus 1212 allows data communication between central processor 1214 and system memory 1217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1210 are generally stored on and accessed via a computer-readable medium, such as a hard disk drive (e.g., fixed disk 1244), an optical drive (e.g., optical drive 1240), a floppy disk unit 1237, or other storage medium. Additionally, applications can be in the form of electronic signals modulated in accordance with the application and data communication technology when accessed via network modem 1247 or interface 1248.

Storage interface 1234, as with the other storage interfaces of computer system 1210, can connect to a standard computer-readable medium for storage and/or retrieval of information, such as a fixed disk drive 1244. Fixed disk drive 1244 may be a part of computer system 1210 or may be separate and accessed through other interface systems. Modem 1247 may provide a direct connection to a remote server via a telephone link or to the Internet via an internet service provider (ISP). Network interface 1248 may provide a direct connection to a remote server via a direct network link to the Internet via a POP (point of presence). Network interface 1248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 12 need not be present to practice the present invention. The devices and subsystems can be interconnected in different ways from that shown in FIG. 12. The operation of a computer system such as that shown in FIG. 12 is readily known in the art and is not discussed in detail in this application. Code to implement the present invention can be stored in computer-readable storage media such as one or more of system memory 1217, fixed disk 1244, optical disk 1242, or floppy disk 1238. The operating system provided on computer system 1210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 13:
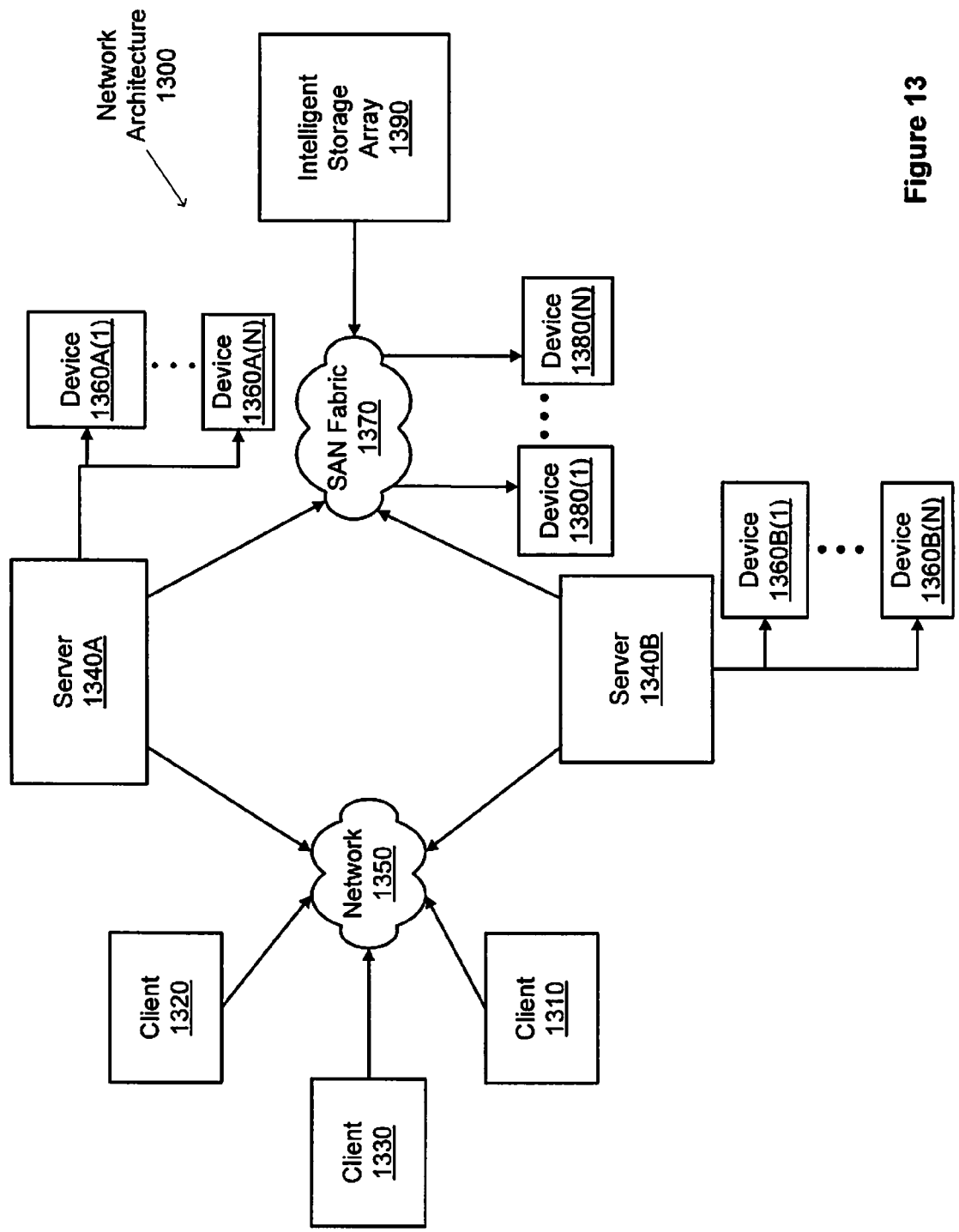
FIG. 13 is a block diagram depicting a network architecture suitable for implementing embodiments of the present invention.

FIG. 13 is a block diagram depicting a network architecture 1300 in which client systems 1310, 1320 and 1330, as well as storage servers 1340A and 1340B (any of which can be implemented using computer system 1210), are coupled to a network 1350. Storage server 1340A is further depicted as having storage devices 1360A(1)-(N) directly attached, and storage server 1340B is depicted with storage devices 1360B(1)-(N) directly attached. Storage servers 1340A and 1340B are also connected to a SAN fabric 1370, although connection to a storage area network is not required for operation of the invention. SAN fabric 1370 supports access to storage devices 1380(1)-(N) by storage servers 1340A and 1340B, and so by client systems 1310, 1320 and 1330 via network 1350. Intelligent storage array 1390 is also shown as an example of a specific storage device accessible via SAN fabric 1370.

With reference to computer system 1210, modem 1247, network interface 1248 or some other method can be used to provide connectivity from each of client computer systems 1310, 1320 and 1330 to network 1350. Client systems 1310, 1320 and 1330 are able to access information on storage server 1340A or 1340B using, for example, a web browser or other client software (not shown). Such a client allows client systems 1310, 1320 and 1330 to access data hosted by storage server 1340A or 1340B or one of storage devices 1360A(1)-(N), 1360B(1)-(N), 1380(1)-(N) or intelligent storage array 1390. FIG. 13 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of cache manager 230 and client computer 210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include computer-readable storage media, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving, from a version repository client, a first request for requested information stored in a repository of a revision control system, wherein the repository comprises a plurality of historical copies of information;
   if the requested information is stored in local storage of the version repository client, providing the requested information from the local storage of the version repository client, wherein the local storage comprises a cache, a metadata cache, and non-cache storage, wherein the cache stores original file data received from the repository, and wherein the non-cache storage stores only modified copies of the file data stored in the cache; and
   if the requested information is not stored in the local storage of the version repository client,
      transmitting, from the version repository client, a second request for the requested information to a remote repository server coupled to the repository,
      receiving the requested information from the remote repository server in response to the second request, and
      in response to said receiving the requested information, providing the requested information and storing the requested information in the local storage of the version repository client, wherein storing the requested information comprises adding an added node to an ordered tree data structure in the metadata cache, wherein adding the added node to the ordered tree data structure in the metadata cache comprises removing a node from the ordered tree data structure to prevent the ordered tree data structure from exceeding a certain number of nodes, wherein nodes in the ordered tree data structure are ordered based upon how recently each node was used, wherein files in the cache are subject to eviction to make room for new files in the cache, and wherein modified versions of files in the non-cached storage are not subject to eviction from the non-cached storage.

2. The method of claim 1 wherein the requested information is metadata associated with a file.

3. The method of claim 2 further comprising:
   if the requested information is stored in the metadata cache, retrieving the requested information from the metadata cache.

4. The method of claim 3 wherein said retrieving the requested information further comprises:
   searching the ordered tree data structure, wherein the metadata cache is structured as the ordered tree data structure.

5. The method of claim 4 further comprising:
   performing said searching using a revision number associated with the file, wherein
      the first request comprises the revision number, and
      the ordered tree data structure uses a range of revision numbers as keys associated with nodes of the ordered tree data structure.

6. The method of claim 3 wherein the metadata cache is stored in one of persistent memory or non-persistent memory.

7. The method of claim 2 wherein said receiving the requested information from the remote repository server further comprises:
   receiving additional file information associated with one or more files in a same directory as the requested file information, wherein
      the second request comprises a request for file information related to the requested information.

8. The method of claim 7 further comprising:
   storing the additional file information in the local storage.

9. The method of claim 1 wherein
   the added node has an associated node key that comprises a revision number associated with the file, and
   the requested information is associated with the added node; and
   said storing the requested information in the metadata cache comprises:
   examining nodes in the ordered tree data structure adjacent to the added node to determine if the metadata associated with one of the adjacent nodes is the same as the requested information associated with the added node; and if the metadata associated with one of the adjacent nodes is the same as the requested information, extending a range of revision numbers in the node key of the adjacent node to include the revision number of the added node, and deleting the added node.

10. The method of claim 1 wherein
the added node has an associated key that comprises a range of revision numbers associated with the file, and
the requested information is associated with the added node; and
said storing the requested information in the metadata cache comprises:
examining a node in the ordered tree data structure to determine if a key associated with the examined node is within the range of revision numbers associated with the added node; and
if the key associated with the examined node is within the range of revision numbers of the added node, deleting the examined node.

11. The method of claim 1 wherein
the added node has an associated key that comprises a range of revision numbers associated with the file, and
the requested information is associated with the added node; and
said storing the requested information in the metadata cache comprises:
examining a node in the ordered tree data structure to determine if a key associated with the examined node is a range of revision numbers that overlaps with the range of revision numbers associated with the added node; and
if the key associated with the examined node overlaps the range of revision numbers associated with the added node, extending the range of revision numbers of the key of the examined node to include the range of revision numbers associated with the key of the added node, and deleting the added node.

12. The method of claim 1 wherein the requested information is data associated with a file.

13. The method of claim 12 further comprising:
retrieving the requested information from a persistent storage cache.

14. The method of claim 13 wherein said retrieving the requested information comprises:
providing a cache key associated with the file to a manager of the persistent storage cache, wherein
the cache key is generated using metadata associated with the file;
receiving the requested information if the data associated with the file is stored in the persistent storage cache; and
receiving an indication that the data associated with the file is not stored in the persistent storage cache if the data associated with the file is not stored in the persistent storage cache.

15. The method of claim 14 further comprising:
performing said transmitting the second request in response to said receiving an indication that the data associated with the file is not stored in the persistent storage cache.

16. The method of claim 12 wherein said storing the requested information in the local storage further comprises:
compressing the requested information; and
storing the compressed requested information in the local storage.

17. The method of claim 1 further comprising:
recording an identifier of the requested information in a list of accessed file information.

18. The method of claim 1, wherein the version repository client maintains a single copy of a file received from the repository in the local storage, if the file has not been modified by the version repository client subsequent to being received from the repository.

19. A system comprising:
a local storage configured to store information, wherein the local storage is a computer readable storage medium coupled to a version repository client, wherein the local storage comprises a cache, a metadata cache, and non-cache storage, wherein the cache stores original file data received from a repository of a revision control system, and wherein the non-cache storage stores only modified copies of the file data stored in the cache;
a processing device configured to implement a cache manager for the version repository client, coupled to the local storage, the cache manager comprising a cache manager processor module coupled to an interface module and a query interface module, wherein
the interface module is configured to receive a first request, from the version repository client, for requested information stored in the repository, wherein the repository comprises a plurality of historical copies of information,
the cache manager processor module is configured to
provide the requested information from the local storage if the requested information is stored in the local storage, and
if the requested information is not stored in the local storage,
transmit a second request, from the version repository client, for the requested information to a remote repository server, coupled to the repository, using the query interface module,
receive the requested information from the remote repository server using the query interface module in response to the second request, and
in response to said receiving the requested information, provide the requested information and store the requested information in the local storage, wherein storing the requested information comprises adding an added node to an ordered tree data structure in the metadata cache, wherein adding the added node to the ordered tree data structure in the metadata cache comprises removing a node from the ordered tree data structure to prevent the ordered tree data structure from exceeding a certain number of nodes, wherein nodes in the ordered tree data structure are ordered based upon how recently each node was used, wherein files in the cache are subject to eviction to make room for new files in the cache, and wherein modified versions of files in the non-cached storage are not subject to eviction from the non-cached storage, and
the query interface module is configured to transmit the second request to the remote repository server and receive the requested information from the remote repository server.

20. The system of claim 19 wherein the cache manager processor module is further configured to:
retrieve the requested information from the metadata cache, if the requested information is stored in the metadata cache, wherein
the requested information is metadata associated with a file.

21. The system of claim 20 wherein the cache manager processor module is further configured to:
   search an ordered tree data structure to retrieve the requested information, wherein
      the metadata cache is structured as the ordered tree data structure,
      said searching is performed using a revision number associated with the file,
      the first request comprises the revision number, and
      the ordered tree data structure uses a range of revision numbers as keys associated with nodes of the ordered tree data structure.

22. The system of claim 20 wherein the metadata cache is stored in one of persistent memory or non-persistent memory.

23. The system of claim 20 wherein the cache manager processor module is configured to receive the requested information from the remote repository server by being further configured to:
   receive additional file information associated with one or more files in a same directory as the requested file information, wherein
      the second request comprises a request for file information related to the requested information; and
   store the additional file information in the local storage.

24. The system of claim 19 wherein
   the added node has an associated key that comprises a revision number associated with the file, and
   the requested information is associated with the added node; and
   the cache manager processor module is configured to store the requested information in the metadata cache by being further configured to:
   examine nodes in the ordered tree data structure adjacent to the added node to determine if the metadata associated with one of the adjacent nodes is the same as the requested information associated with the added node; and
   if the metadata associated with one of the adjacent nodes is the same as the requested information, extend a range of revision numbers in the key of the adjacent node to include the revision number of the added node, and delete the added node.

25. The system of claim 19 wherein
   the added node has an associated key that comprises a range of revision numbers associated with the file, and
   the requested information is associated with the added node; and
   the cache manager processor module is configured to store the requested information in the metadata cache by being further configured to:
   examine a node in the ordered tree data structure to determine if a key associated with the examined node is within the range of revision numbers associated with the added node; and
   if the key associated with the examined node is within the range of revision numbers of the added node, delete the examined node.

26. The system of claim 19 wherein the cache manager processor module is further configured to:
   retrieve the requested information from a persistent storage cache, wherein the requested information is data associated with a file, and
   the local storage is the persistent storage cache.

27. The system of claim 26 wherein the cache manager processor module is further configured to:
   provide a cache key associated with the file to a manager of the persistent storage cache, wherein
      the cache key is generated using metadata associated with the file;
   receive the requested information if the data associated with the file is stored in the persistent storage cache; and
   receive an indication that the data associated with the file is not stored in the persistent storage cache if the data associated with the file is not stored in the persistent storage cache.

28. The system of claim 27 wherein the cache manager processor module is further configured to:
   perform said transmitting the second request in response to said receiving an indication that the data associated with the file is not stored in the persistent storage cache.

29. A non-transitory computer readable storage medium comprising:
   a first set of instructions, executable by a processor, configured to receive, from a version repository client, a first request for requested information stored in a repository of a revision control system, wherein the repository comprises a plurality of historical copies of information;
   a second set of instructions, executable by the processor, configured to determine whether the requested information is stored in a local storage of the version repository client, wherein the local storage comprises a cache, a metadata cache, and non-cache storage, wherein the cache stores original file data received from the repository, and wherein the non-cache storage stores only modified copies of the file data stored in the cache;
   a third set of instructions, executable by the processor, responsive to determining that the requested information is stored in the local storage of the version repository client and configured to provide the requested information from the local storage of the version repository client; and
   a fourth set of instructions, executable by the processor, responsive to determining that the requested information is not stored in the local storage and configured to transmit, from the version repository client, a second request for the requested information to a remote repository server coupled to the repository, receive the requested information from the remote repository server in response to the second request, and, in response to said receiving the requested information, provide the requested information and store the requested information in the local storage of the version repository client, wherein storing the requested information comprises adding an added node to an ordered tree data structure in the metadata cache, wherein adding the added node to the ordered tree data structure in the metadata cache comprises removing a node from the ordered tree data structure to prevent the ordered tree data structure from exceeding a certain number of nodes, wherein nodes in the ordered tree data structure are ordered based upon how recently each node was used, wherein files in the cache are subject to eviction to make room for new files in the cache, and wherein modified versions of files in the non-cached storage are not subject to eviction from the non-cached storage.

30. The non-transitory computer readable storage medium of claim 29 further comprising:
   a fifth set of instructions, executable by the processor, configured to retrieve the requested information from the metadata cache, wherein the requested information is metadata associated with a file.

31. The non-transitory computer readable storage medium of claim 30 wherein the fifth set of instructions further comprises:
 a sixth set of instructions, executable by the processor, configured to search an ordered tree data structure, wherein
  the metadata cache is structured as the ordered tree data structure,
  said searching uses a revision number associated with the file,
  the first request comprises the revision number, and
  the ordered tree data structure uses a range of revision numbers as keys associated with nodes of the ordered tree data structure.

32. The non-transitory computer readable storage medium of claim 30 wherein the metadata cache is stored in one of persistent memory or non-persistent memory.

33. The non-transitory computer readable storage medium of claim 30 wherein the fourth set of instructions further comprises:
 a sixth set of instructions, executable by the processor, configured to receive additional file information associated with one or more files in a same directory as the requested file information, wherein
  the second request comprises a request for file information related to the requested information; and
 a seventh set of instructions, executable by the processor, configured to store the additional file information in the local storage.

34. The non-transitory computer readable storage medium of claim 29 wherein
 the added node has an associated key that comprises a revision number associated with the file, and
 the requested information is associated with the added node; and
 the sixth set of instructions further comprises:
 an eighth set of instructions, executable by the processor, configured to examine nodes in the ordered tree data structure adjacent to the added node to determine if the metadata associated with one of the adjacent nodes is the same as the requested information associated with the added node; and
 a ninth set of instructions, executable by the processor, configured to extend a range of revision numbers in the key of the adjacent node to include the revision number of the added node and delete the added node, if the metadata associated with one of the adjacent nodes is the same as the requested information.

35. The non-transitory computer readable storage medium of claim 29 wherein
 the added node has an associated key that comprises a range of revision numbers associated with the file, and
 the requested information is associated with the added node; and
  the sixth set of instructions further comprises:
  an eighth set of instructions, executable by the processor, configured to examine a node in the ordered tree data structure to determine if a key associated with the examined node is within the range of revision numbers associated with the added node; and
 a ninth set of instructions, executable by the processor, configured to delete the examined node if the key associated with the examined node is within the range of revision numbers of the added node.

36. The non-transitory computer readable storage medium of claim 29 further comprising:
 a fifth set of instructions, executable by the processor, configured to retrieve the requested information from a persistent storage cache, wherein
  the requested information is data associated with a file, and
  the local storage is the persistent storage cache.

37. The non-transitory computer readable storage medium of claim 36 wherein the fifth set of instructions further comprises:
 a sixth set of instructions, executable by the processor, configured to provide a cache key associated with the file to a manager of the persistent storage cache, wherein
  the cache key is generated using metadata associated with the file;
 a seventh set of instructions, executable by the processor, configured to receive the requested information if the data associated with the file is stored in the persistent storage cache; and
 an eighth set of instructions, executable by the processor, configured to receive an indication that the data associated with the file is not stored in the persistent storage cache if the data associated with the file is not stored in the persistent storage cache.

38. The non-transitory computer readable storage medium of claim 37 wherein the fifth set of instructions further comprises:
 a ninth set of instructions, executable by the processor, configured to perform said transmitting the second request in response to the indication provided by the eighth set of instructions.

* * * * *